Feb. 28, 1967  O. R. NEMETH  3,306,697
PORTABLE MOVIE FILM VIEWER
Filed Feb. 23, 1965
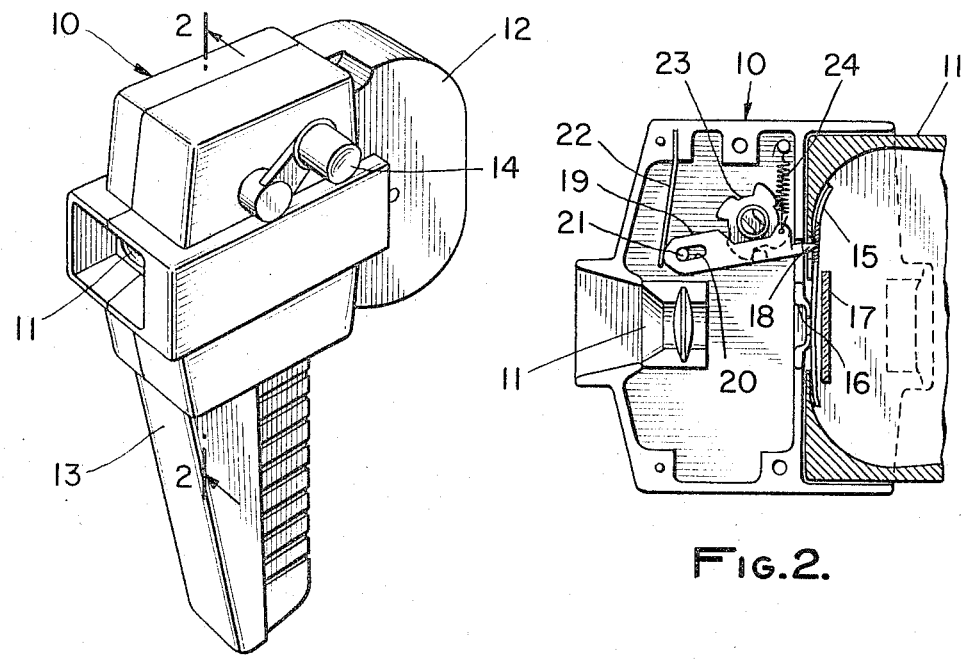
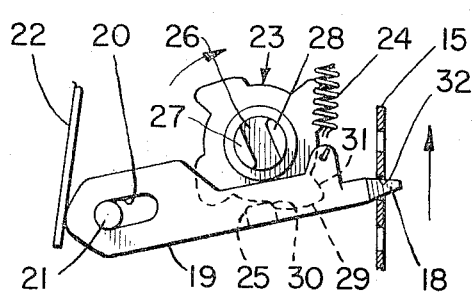
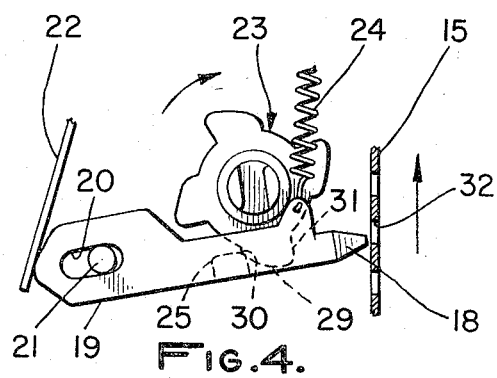
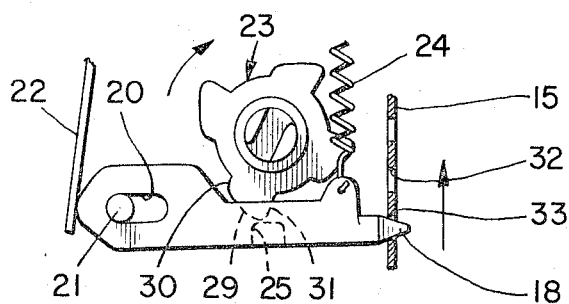
INVENTOR.
OTTO R. NEMETH
BY
Elliott & Pastoriza
ATTORNEYS

United States Patent Office 3,306,697
Patented Feb. 28, 1967

3,306,697
PORTABLE MOVIE FILM VIEWER
Otto R. Nemeth, 11907 San Vicente Blvd.,
Los Angeles, Calif. 90049
Filed Feb. 23, 1965, Ser. No. 434,241
7 Claims. (Cl. 352—129)

This invention relates generally to motion picture devices and more particularly to an improved portable motion picture film viewer of the type adapted to be held in one hand and operated with the other hand to enable a private viewing of a movie film.

A primary object of this invention is to provide an improved portable movie film viewer of the above type which includes relatively few moving parts and therefore may be economically manufactured and which is easy to operate.

Another object is to provide an improved portable movie film viewer in combination with a magazine containing the film to be viewed wherein the film itself may be of the endless type and simply positioned for operation by the viewer by sliding the magazine into one end of the viewer so that no threading of the film is necessary.

Still another object is to provide an improved movie film viewer which is compact in construction and yet may accommodate up to fifty or more feet of 8 mm. movie film.

Briefly, these and many other objects and advantages of this invention are attained by providing a casing having a viewing opening in one end and means at its other end for receiving a film magazine. The arrangement is such that when a film magazine is received in the casing, film in the magazine itself is positioned for viewing through the viewing opening.

Within the casing there is provided a single claw member mounted for forward and rearward movement as well as up and down movement. This claw member includes a driving claw positioned to engage within a sprocket hole of the film. A cam wheel, in turn, is provided with at least one camming surface so designed as to successively effective rearward, downward, forward, and upward movement of the claw member so that successive pictures of the film are moved past the viewing opening to enable successive viewing of the pictures. The upward movement is effected by a spring means so that a snap-like action occurs and no shutter is necessary, the film remaining in successive positions during the length of time that the driving claw is retracted, moved downwardly, and repositioned in the next adjacent sprocket.

As a consequence of the foregoing arrangement, many of the moving parts heretofore deemed necessary in viewers can be eliminated with the advantage of relatively economical manufacture.

A better understanding of the invention will be had by now referring to a preferred embodiment thereof as illustrated in the accompanying drawings, in which:

FIGURE 1 is a perspective view of the portable movie film viewer of this invention;

FIGURE 2 is a fragmentary cross-section taken generally in the direction of the arrows 2—2 of FIGURE 1;

FIGURE 3 is an enlarged elevational view partly in cross-section of an interior mechanism within the casing of the viewer with various parts in a first position;

FIGURE 4 is a view similar to FIGURE 3 showing the parts in a next successive position; and, FIGURE 5 is a view similar to FIGURE 3 showing the parts in a still further successive position during the operation of the device.

Referring first to FIGURE 1, the the viewer includes a casing 10 having a viewing opening 11 at one end and means at its other end for receiving a transparent or translucent film magazine 12. The casing may be provided with a lower handle 13 to enable holding of the viewer. Also provided is a crank 14 enabling the viewer with his other hand to operate the mechanism within the casing to effect successive movements of the film within the magazine 12 for viewing purposes.

Referring particularly to FIGURE 2, it will be noted that the film 15 in the magazine 11 is positioned in front of a gate 16 there being provided a suitable guide plate 17 in the magazine to guide the film past the gate 16. In this position, the film is aligned for proper viewing through the viewing opening 11. The film 15 itself is provided with the usual sprocket holes, one such hole as shown in FIGURE 2 receiving a driving claw 18 at one end of a driving claw member 19. The other end of the claw member 19 is provided with an elongated slot 20 receiving a pivot pin 21. A first spring in the form of a band structure 22 engages the rear of the claw member 19 to urge it forwardly so that the pin 21, in the position shown, is against the rear of the slot 20.

Within the casing there is also rotatably mounted a cam wheel 23 above the claw member 19. The cam wheel 23 is arranged to be rotated in a clockwise direction, as viewed in FIGURE 2, by means of the crank 14 of FIGURE 1. This crank is coupled through a side of the casing to the cam wheel 23 as will become clearer as the description proceeds.

A second spring 24 is coupled between the driving claw 19 and a stationary point in the casing 10. The springs 22 and 24 constitute a biasing or spring means which generally urge the claw member 19 in a forward and upward direction, respectively.

Referring now to FIGURES 3, 4, and 5, the manner in which the cam wheel 23, when rotated, effects movement of the claw member 19 in such a manner as to successively display pictures on the film 15 for viewing through the opening 11 will be understood. With reference first to FIGURE 3, it will be noted that the claw member 19 includes a cam follower projection 25 which is arranged to engage the cam wheel 23. The inner hub portion of the cam wheel 23 includes a cross-partition 26 defining end slots 27 and 28 which are arranged to receive suitable coupling projections on the crank 14 of FIGURE 1 (not shown) to enable rotation of the cam wheel. Preferably, there is effected a suitable clutching action with the crank 14 so that the cam wheel 23 can only be rotated in a clockwise direction.

The cam wheel, as shown, includes four camming surfaces all of which are identical and preferably spaced at 90°. Since these surfaces are the same, a detailed description of one will suffice for all. Referring first to the lower surface in engagement with the cam follower projection 25, this cam surface includes a rearwardly sloping surface portion 29 terminating in a shoulder 30. The leading edge of the sloping surface 29 is fairly steep as indicated at 31. In FIGURE 3, the driving claw 18 is shown engaged in a sprocket hole 32 in the film 15.

Assume now that the cam wheel 23 is rotated in a clockwise direction, as indicated by the arrow in FIGURE 3. This motion will initially cause the claw member 19 to move rearwardly, the slot 20 accommodating this movement. The rearward movement is a consequence of the shoulder 30 engaging the cam follower projection 25.

When the pivot pin 21 reaches the right hand side of the slot 20 to stop rearward movement of the claw member 19, the cam projection 25 will be caused to ride up over the rearwardly sloping surface 29. This latter action results in a lowering of the driving claw 18, this claw having been retracted from the sprocket hole 32 as indicated in FIGURE 4. The lowering action is a consequence of a partial rotation of the claw member 19 about the pivot pin 21 as the cam follower 25 rides up on the sloping surface 29.

During the above-noted movement, as the cam follower approaches the leading edge 31, the rear spring 22 will urge the claw member 19 forwardly to cause the driving claw 18 to engage in the next successive sprocket hole 33, all as illustrated in FIGURE 5. As the wheel 22 continues to rotate, the leading edge 31 will move past the cam follower projection 25 and thus leave the claw member 19 free to be snapped upwardly by the spring 24. This upward movement results in a snapping upward movement of the film to position the next picture juxtaposed to the film gate for proper viewing through the viewing opening.

As the cam wheel 23 is rotated continuously, the next cam surface spaced at 90° will engage the projection 25 which will now be in the position illustrated in the FIGURES 2 and 3 so that the shoulder portion of the cam surface again moves the claw member 19 rearwardly.

The cycle, as described above, is repeated each time a cam surface passes the cam follower projection 25 so that the film is moved in rapid successive increments to provide the illusion of moving pictures.

An important feature of this invention resides in the cam surface construction wherein a steep leading edge 31 is provided in cooperation with the biasing spring 24. This arrangement permits a very rapid or snapping type upward movement of the driving claw 18 which moves the film with sufficient speed so that no shutter in the mechanism is necessary. In other words, the "rest" periods for the pictures in front of the gate are of a considerable duration compared to the increment of time the film is moved from one picture to the other. The result is a faithful reproduction of a motion picture without the various complicated shutter mechanisms and similar structures heretofore deemed necessary.

From the foregoing description, it will thus be evident that the present invention has provided a greatly improved portable movie film viewer which employs a relatively few number of parts and may be manufactured relatively economically.

What is claimed is:

1. A portable movie film viewer comprising, in combination: a casing defining a viewing opening and means for holding a film in position to be viewed through said viewing opening; a claw means in said casing having a driving claw in a position to engage a sprocket hole in said film; and means for moving said claw means in successive rearward, downward, forward, and upward directions to thereby effect a successive positioning of pictures on said film for viewing through said viewing means, said means for moving said claw means including a cam wheel rotatably mounted in said casing above said claw means and including a cam surface having a steep leading edge, and a rearward sloping portion terminating in a shoulder, said claw means including a single cam follower projection; means mounting said claw means for forward and rearward movement and for up and down movement; and spring means urging said claw means forwardly and upwardly to effect engagement of said cam follower projection with said cam surface, said shoulder on said cam surface urging said claw means rearwardly to disengage said claw means from a sprocket hole in said film upon rotation of said cam wheel and said steep leading edge releasing said claw means upon further rotation of said wheel so that said spring means snaps said claw means forwardly and upwardly to drive said film.

2. A viewer according to claim 1, including a crank means exterior of said casing and coupled to said cam wheel through one side of said casing to enable manual rotation of said cam wheel.

3. A portable movie film viewer comprising, in combination: a casing having a viewing opening at one end and a film magazine receiving means at its other end for enabling the positioning of a film having sprocket holes in a position to be viewed through said viewing opening; a driving claw member in said casing having a driving claw positioned to engage in one of said sprocket holes in said film when said magazine is received in said casing; a rotatable cam means in said casing above said claw member and including a cam surface for effecting rearward and downward movement of said claw member to enable disengagement of said driving claw from a sprocket hole and positioning of said driving claw to be received in the next adjacent sprocket hole; and biasing means urging said claw member forwardly and upwardly to effect movement of said film by said driving claw after said cam means has been rotated past said claw member.

4. A viewer according to claim 3, in which said rotatable cam means comprises a cam wheel, said cam surface being on the periphery of said wheel and defined by a steep leading edge, and a rearwardly sloping portion terminating in a rear shoulder, said claw member including a single cam follower projection held in camming engagement with said cam surface by said biasing means.

5. A portable movie film viewer comprising, in combination: a casing having a viewing opening at one end; a film magazine receivable in the other end of said casing and including a film; guide means for supporting a portion of said film in a position to be viewed through said viewing opening; gate means defining an opening through which successive pictures on said film may be viewed when said film is moved past said gate means; a driving claw member in said casing having a driving claw at one end adapted to project into a sprocket hole in said film, the other end of said claw member being slotted; a pivot pin on said casing passing through said slot so that said claw member can slide along said pivot pin over the extent of said slot in a direction generally normal to said film and rotate about said pivot pin to impart upward and downward motion to said driving claw in a direction generally parallel to said film; a cam wheel mounted for rotation in said casing above said claw member and including at least one cam surface on its periphery having a relatively steep leading edge followed by a rearward sloping portion terminating in a rear shoulder portion; a single cam follower projection on said claw member; spring means urging said cam follower member into camming engagement with said surface, said spring means biasing said claw member forwardly and upwardly; and means for rotating said cam wheel in a given direction whereby said rear shoulder portion of said cam surface initially moves said claw member rearwardly to retract said driving claw from said sprocket hole, thence said rearward sloping portion rotates said claw member to move said driving claw downwardly, at which point said claw member is free to move forwardly to move its driving claw into the next sprocket opening in said film, said spring means then rotating said claw member to snap said driving claw upwardly as said front leading edge of said cam surface passes said cam follower projection on said claw member to thereby position the next successive picture on said film in position for viewing.

6. A viewer according to claim 5, in which said spring means includes a first spring positioned rearwardly of said claw member for urging said claw member forwardly and a second spring coupled adjacent to the front end of said claw member and a portion of said casing above said claw member to urge said claw member upwardly.

7. A viewer according to claim 6, in which said cam wheel includes three additional cam surfaces identical to said first mentioned one cam surface to provide a total of four surfaces, said surfaces being spaced successively at 90° about the periphery of said wheel.

References Cited by the Examiner

UNITED STATES PATENTS 2,449,483   9/1948   Iwick _____ 352—129

2,834,249   5/1958   May _____ 352—194 X
2,963,940   12/1960  Raabe _____ 352—129

FOREIGN PATENTS 244,081   5/1926   Great Britain.
708,425   5/1954   Great Britain.
92,608    6/1959   Netherlands.

NORTON ANSHER, *Primary Examiner.*

V. A. SMITH, *Assistant Examiner.*